(12) United States Patent
Duis et al.

(10) Patent No.: US 8,699,012 B2
(45) Date of Patent: Apr. 15, 2014

(54) OPTICAL FIBER ALIGNMENT MEASUREMENT METHOD AND APPARATUS

(75) Inventors: Jeroen Antonius Maria Duis, Didam (NL); Jan Willem Rietveld, Benschop (NL)

(73) Assignee: Tyco Electronics Nederland B.V., S-Hertogenbosch (NL)

( * ) Notice: Subject to any disclaimer, the term of this patent is extended or adjusted under 35 U.S.C. 154(b) by 637 days.

(21) Appl. No.: 12/725,864

(22) Filed: Mar. 17, 2010

(65) Prior Publication Data
US 2011/0228259 A1    Sep. 22, 2011

(51) Int. Cl.
*G01N 21/00* (2006.01)
*G01B 11/00* (2006.01)
*G01B 11/14* (2006.01)

(52) U.S. Cl.
USPC ............................ 356/73.1; 356/399; 356/614

(58) Field of Classification Search
None
See application file for complete search history.

(56) References Cited

U.S. PATENT DOCUMENTS

| | | | |
|---|---|---|---|
| 4,727,637 A * | 3/1988 | Buckwitz et al. | 29/407.04 |
| 5,177,557 A * | 1/1993 | Yamane | 356/73.1 |
| 5,220,407 A * | 6/1993 | Yamane et al. | 356/625 |
| 5,596,662 A * | 1/1997 | Boscher | 385/55 |
| 5,619,262 A * | 4/1997 | Uno | 348/297 |
| 5,666,450 A * | 9/1997 | Fujimura et al. | 385/93 |
| 5,682,672 A * | 11/1997 | Taniguchi et al. | 29/748 |
| 5,980,120 A * | 11/1999 | Narayanan | 385/89 |
| 6,118,910 A * | 9/2000 | Chang | 385/16 |
| 6,685,363 B2 * | 2/2004 | Kryzak | 385/89 |
| 6,705,767 B1 * | 3/2004 | Dean et al. | 385/85 |
| 6,793,401 B2 * | 9/2004 | Daniel | 385/54 |
| 7,042,562 B2 * | 5/2006 | Kiani et al. | 356/237.1 |
| 7,192,196 B2 * | 3/2007 | Sasaki et al. | 385/75 |
| 2001/0007603 A1 | 7/2001 | Sakural et al. | |
| 2004/0028348 A1 * | 2/2004 | Cote et al. | 385/88 |
| 2004/0042733 A1 * | 3/2004 | Kang et al. | 385/71 |
| 2009/0269006 A1 * | 10/2009 | Ishikawa et al. | 385/25 |

FOREIGN PATENT DOCUMENTS

| | | | |
|---|---|---|---|
| JP | 06130251 A | * | 5/1994 |
| JP | 06201950 A | * | 7/1994 |
| JP | 2000131187 A | * | 5/2000 |

OTHER PUBLICATIONS

International Search Report, International Application No. PCT/US2011/000458, International Filing Date Mar. 11, 2011.

* cited by examiner

*Primary Examiner* — Gordon J Stock, Jr.

(57) ABSTRACT

A measurement system comprising an analog position sensitive device is provided that can measure the XY position of a plurality of light beams at very high resolution. In accordance with one exemplary associated method, a connector bearing one or more optical fibers is fixedly positioned before a position sensing detector so that light emanating from the ends of the optical fibers will strike the position sensing detector. A light beam is passed through at least one opening in the connector, such as a guide pin hole onto the detecting surface of the PSD to establish the position of the connector. Next, each optical fiber in the connector is individually illuminated sequentially so that the light emanating from the fiber falls on the position sensing detector. The locations of all of these light beams striking the PSD are compared to position of the light beam passed through the guide pins and/or to each other to determine if all the fibers are in the correct positions relative to the connector. In addition, it is possible to simultaneously measure the magnitude of the light emanating from each fiber in order to measure the quality of the light transmission through the connector/cable assembly.

20 Claims, 4 Drawing Sheets

OPTICAL FIBER ALIGNMENT MEASUREMENT METHOD AND APPARATUS

FIELD OF TECHNOLOGY

The invention pertains to systems, apparatus, and methods for measuring the alignment of optical fibers in an optical connector, such as to assure that the ferrules in a connector and the optical fibers positioned within those ferrules are within expected tolerances.

BACKGROUND OF THE INVENTION

Optical fiber cables are becoming increasingly more common for use in transmitting high speed data in communication networks. These optical fibers must be terminated to equipment (e.g., optical transmitters such as lasers and LEDs or optical receivers, such as photodiodes, etc.) or other fibers. This is done through the use of ferrules and connectors at the ends of optical fiber cables that join with mating connectors on the termination equipment. As is well known, these connectors comprise ferrules within which the individual optical fibers are positioned very precisely so that they will align with the light receiving or light emitting face of the component to which it is being connected (or to the corresponding fibers of another optical cable). Proper alignment is important to minimize insertion loss so that the maximum amount of light can be transferred from the fiber to the receiving device or from the emitting device to the fiber. This will maximize the number of connectors that can be used in a link or maximize the length of fiber that can be supported.

Accordingly, when an optical cable is terminated with a connector, it is common to measure and test the alignment of the fibers in the connector to assure that they meet certain tolerances (i.e., that all the fibers at the front end of the connector where it will connect to another mating connector, are where they should be relative to the connector body).

There are many standardized form factors for optical connectors, including FC, ST, SC, and MT. The MT form factor is one form factor that is designed to connect cables bearing multiple fibers. For instance, MT connectors are presently available for connecting cables bearing up to 72 individual optical fibers (up to 6 rows of 12 fibers each).

MT type connectors have almost become the de facto type of connector used with multi-fiber interconnects.

There are presently several different types of systems available for measuring fiber alignment in optical connectors, including MT style connectors. Present system, apparatus, and methods for measuring the alignments of fibers in connectors have many disadvantages, such as, long test times, limited accuracy and relatively high equipment costs.

Probably the highest quality systems in terms of accuracy and speed of measurement are optical microscopes with CCD cameras. These systems have resolutions of about 1 micron and require about 10 minutes to measure the positions of all fibers in a 72 fiber connector. Such systems also are relatively expensive. Furthermore, if it is desired to assure the quality of the cable and connector assembly, a separate, subsequent performance test, such as an insertion loss test, is still required.

SUMMARY OF THE INVENTION

A measurement system comprising an analog position sensitive device is provided that can measure the XY position of a plurality of light beams at very high resolution. In accordance with one exemplary associated method, a connector bearing one or more optical fibers is fixedly positioned before a position sensing detector so that light emanating from the ends of the optical fibers will strike the position sensing detector. A light beam is passed through at least one opening in the connector, such as a guide pin hole onto the detecting surface of the PSD to establish the position of the connector. Next, each optical fiber in the connector is individually illuminated sequentially so that the light emanating from the fiber falls on the position sensing detector. The locations of all of these light beams striking the PSD are compared to position of the light beam passed through the guide pins and/or to each other to determine if all the fibers are in the correct positions relative to the connector. In addition, it is possible to simultaneously measure the magnitude of the light emanating from each fiber in order to measure the quality of the light transmission through the connector/cable assembly.

DETAILED DESCRIPTION OF THE INVENTION

A position sensitive device, also sometimes called a position sensing detector, position sensitive detector, or position sensing device (hereinafter PSD) is an optical position sensor that measures the position of a light spot on a sensor surface in one or two dimensions. PSDs generally are one or two types that work according to different principles. In the first class, isotropic sensors, the sensors have an isotropic sensor surface that has a raster-like structure that supplies continuous position data. The principle of isotropic sensors is grounded on the basic operation of a PIN diode. Particularly, when a spot of light within the spectral range of silicon strikes the surface of a PIN diode, a photocurrent is generated that flows from the point of incidence of the light beam through the resistive layers of the PIN diode to electrodes embedded within the diode. Since the ion implanted layer of a PIN diode has very uniform resistivity, the current at each electrode is inversely proportional to the distance between the incident spot of light and the electrode. Accordingly, the position of a light beam incident on the surface of the PIN diode can be accurately determined in two dimensions by relative measurements of the current through four electrodes arranged, for instance, in a square. Furthermore, the overall magnitude of the currents through the various electrodes is indicative of the intensity of the light incident on the diode.

The second class of PSDs, discrete PSDs, operates on a different principle. Particularly, these types of PSDs have a surface partitioned into a plurality of individual light sensors or pixels. The position of a light spot on such a surface can be determined by measuring the relative amount of light received by each pixel. Further, the size of the spot also can be relatively accurately determined by determining the number of pixels illuminated and to what extent. Also, the intensity of the incident light can be determined as a function of the sum current output of all of the pixels.

Either type of PSD can be used in the present invention, but it is believed that, with present technology, isotropic PSDs generally can provide greater position resolution.

Figure 1:
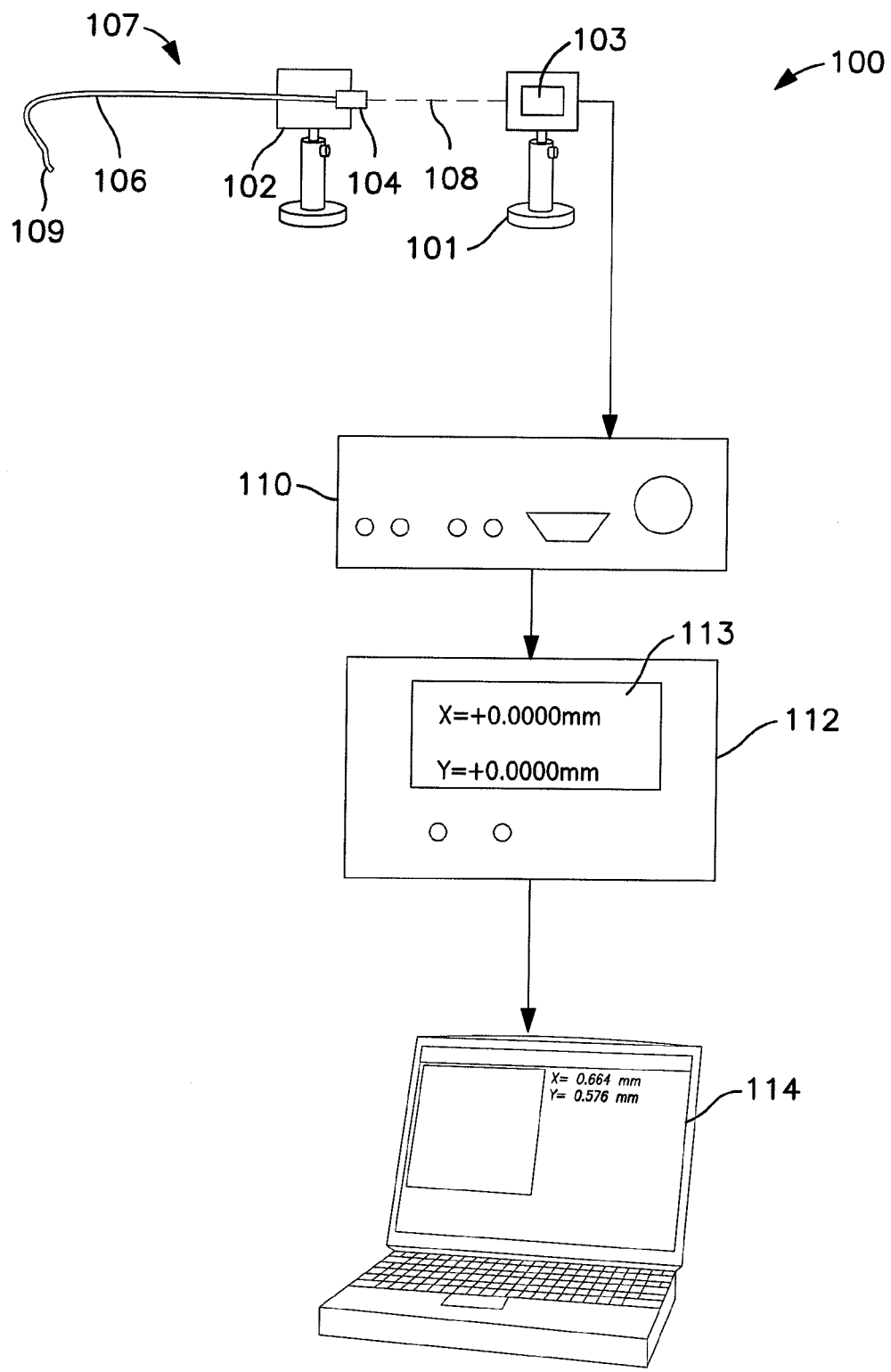
FIG. 1 is a diagram of the basic components of a fiber alignment measurement system in accordance with the principles of the present invention.

FIG. 1 is block diagram illustrating the basic components of a system 100 in accordance with the principles of the present invention. The system 100 includes a PSD 101 with a light sensing or detecting surface 103 for detecting the existence and position of a light beam incident on the surface. It also can detect the intensity of the light incident on the detecting surface 103.

The PSD 101, for instance, may be a PSM 2-10 Position Sensing Module available from On-Trak Photonics, Inc. This particular exemplary PSD is a two dimensional, isotropic PSD that provides a plurality of analog outputs directly proportional to the position of a light spot on the detecting surface 103 and permits simultaneous monitoring of position as well as light intensity.

Figures 4, 5:
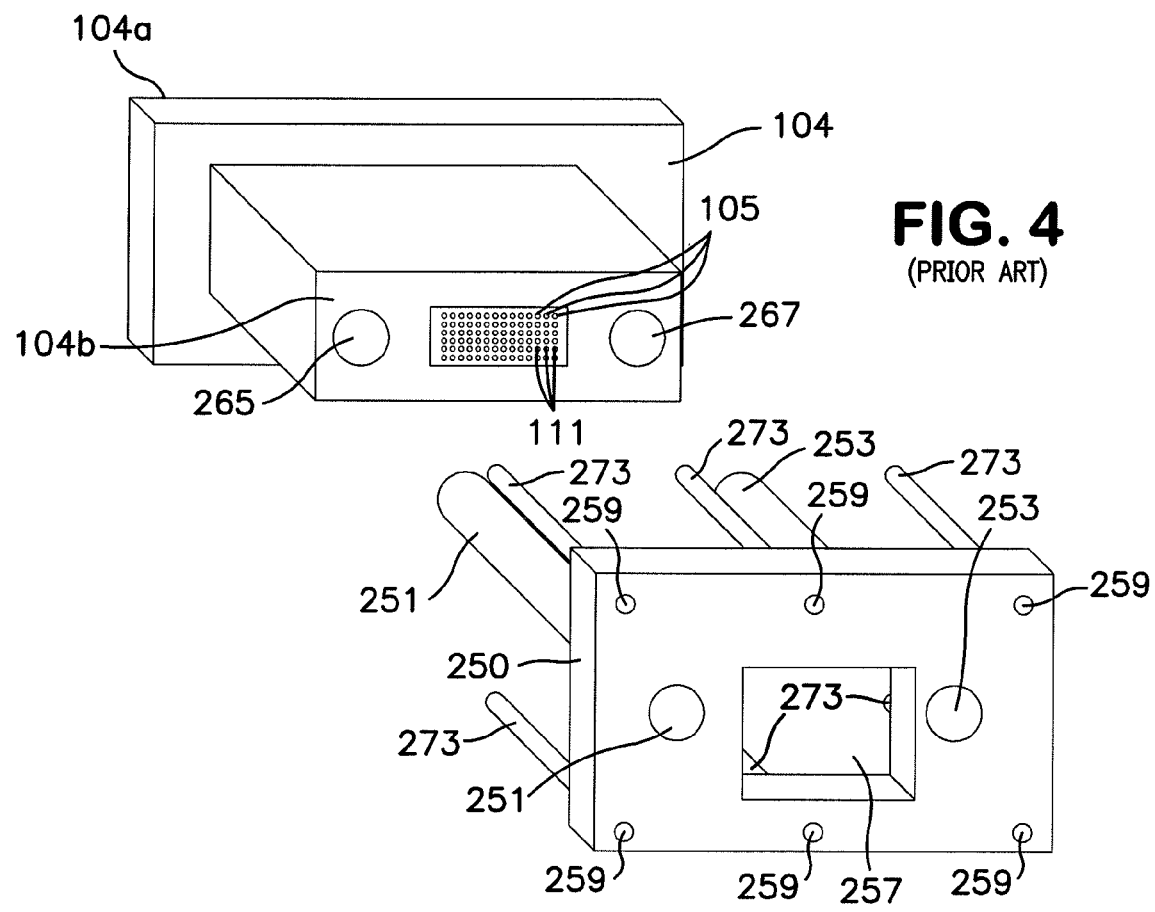
FIG. 4 is a diagram illustrating an exemplary MT connector.
FIG. 5 is a diagram illustrating a jig for use in connection with an MT connector in accordance with the principles of one embodiment of the present invention.

With reference to FIGS. 1 and 4, a connector body 104 is mounted on at least one end of cable 106 to provide a cable/connector assembly 107, with the end of each fiber 111 in the cable 106 encased in a ferrule 105 inside the connector body 104. A mounting mechanism 102 is provided in front of the detecting surface 103 into which a connector body 104, such as an MT ferrule connector, coupled to a fiber optic cable 106 having at least one optical fiber therein, may be mounted with the output end of the connector body 104 facing the detecting surface 103 so that light exiting from the optical fibers or passing through the guide pin holes in the connector will strike the detecting surface 103.

The mounting mechanism 102 may be any reasonable mechanism that can hold the connector body 104 steady relative to the PSD 101 for the duration of the test. It may be as simple as a clamp fixedly mounted to the PSD 101 (or to a bench or table on which the PSD 101 itself also is fixedly mounted). Alternately or additionally, the mounting mechanism 102 may include a portion of a connector receptacle for the particular type of connector being tested. For instance, if the optical connector body 104 is an MT connector, then the mounting mechanism may comprise at least a portion of an MT style receptacle into which the MT connector may be plugged fixedly in front of the detecting surface 103.

In any event, the output of the PSD 101 is fed to circuitry, such as a position sensing amplifier 110 for amplifying the signal from the PSD 101. The amplifier 110, for instance, may be an OT-301 Versatile Position Sensing Amplifier available from On-Trak Photonics, Inc. The amplifier 110 receives the current outputs from the PSD 101 and processes them using a position sensing algorithm to generate X and Y analog outputs that are directly proportional to beam position, independent of changes in beam intensity.

Optionally, display unit 112, such as the OT-302 Display Module available from On-Trak Photonics, Inc. may be coupled to receive the output of the amplifier 110. This particular display unit 112 takes the analog output voltages from the position sensing amplifier 110 and converts them into an absolute position (in millimeters or inches) and displays it on a display screen 113.

The output of the position sensing amplifier 110 or the display module 112 also may be fed to further circuitry, such as a computer 114 for collecting, logging, storing, and processing the measurement data for one or more connectors. For instance, BeamTrak™ software available from On-Trak Photonics, Inc. can be loaded and run on a computer coupled to receive data from the display unit 112. Additional software may be employed to run a comparison of the collected data for each connector with predetermined tolerance data and, based thereon, issue a PASS/FAIL decision for each tested connector.

Figure 3:
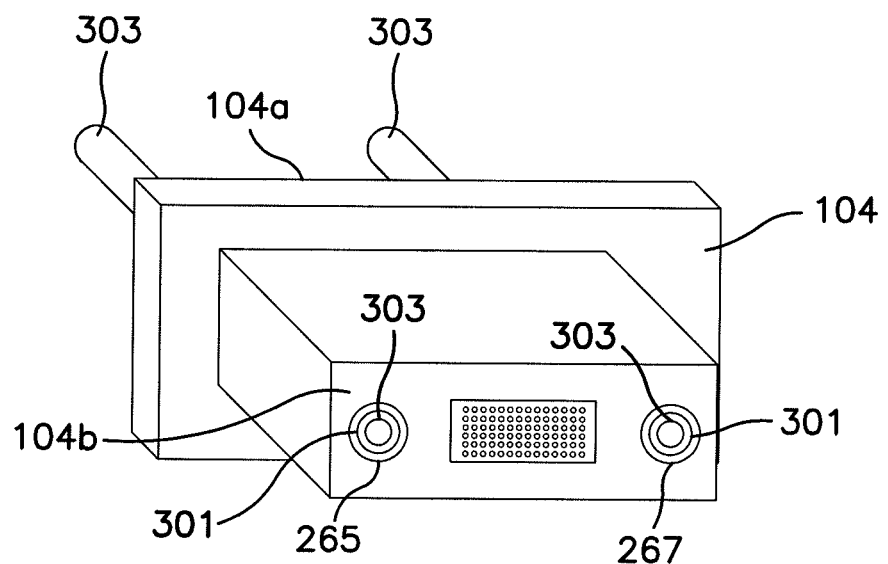
FIG. 3 is a diagram illustrating an exemplary technique and apparatus for performing reference measurement in accordance with one embodiment of the invention.

In use, a light beam 108 can be passed through one or more transparent components of the connector body 104 that will establish the position of the connector body 104 relative to the PSD 101. The transparent component of the connector body through which the light beam 108 may be passed to establish the reference location of the connector may be one or more of the guide pin holes 265, 267 (see FIG. 3) that are commonly found on optical connectors, such as MT style connectors. Such guide pins holes 265, 267 normally are aligned parallel with the optical fibers so that light beams passing through the guide pin holes 265, 267 will be parallel to light emanating from the optical fibers, thus making the task of correlating the connector body 104 position information (as determined by passing light through the guide pin hole) with the optical fiber position information mathematically simple.

Then, light may be individually and sequentially introduced into the back end 109 of each fiber in the cable 106 so that the light is emitted from the fibers at the connector body 104 and impinges on the detecting surface 103. Then the position of the light beam emanating from each fiber as detected by the system 100 can be compared to the position of the light beam that was passed through the transparent component, e.g., 265, 267, of the connector body 104 to determine if they are in the proper positions relative to each other.

In one exemplary process to test the placement of the fibers 111 in an MT connector body 104, the connector body 104 is fixed in the mounting mechanism 102 in front of the PSD 101.

Next, each guide pin hole 265, 267 is individually illuminated with a POF (plastic or polymer optical fiber; not shown) positioned to pass light through the respective guide pin hole 265, 267 from the back end 104*a* to the front end 104*b* of the connector body 104 and onto the PSD detecting surface 103 and the data for each beam spot position 121, 123 (see FIG. 2) on the PSD detecting surface 103 is recorded. This information can be used not only to determine the location of the connector body 104, but also the angular orientation of it. Specifically, a line 124 through the two beam spots 121, 123 (i.e., the locations of the guide pin holes) may be determined to define the angular orientation of the connector. Thereafter, angular alignment of the connector body 104 under test to the PSD 101 is no longer critical since the positions of the fibers 111 in the ferrules 105 of the connector body 104 will be measured relative to the known positions of the guide pin holes (and particularly the line 124 drawn between the two guide pin holes (see FIG. 2)). It is only critical that the connector body 104 does not move relative to the PSD 101 during the taking of the measurements for any particular connector.

Since the guide pin holes 265, 267 are not necessarily very smooth, it is possible that simply illuminating the guide pin holes 265, 267 from the back 104*a* may not result in a sufficiently well defined beam spot 121, 123 on the detecting surface to generate a sufficiently accurate position measurements. For instance, the light may diffract around edges so as to distort the beam and beam spot 121, 123 on the PSD detecting surface 103. If greater accuracy is desired, there are at least two possible ways to achieve it. First, with reference to FIG. 3, a ferrule 301 precisely matched to tightly fit within the guide pin holes 265, 267 and with an optical fiber 303 therein may be placed through each connector guide pin hole 265, 267 (or other transparent opening). In the case of MT connectors 104, for instance, a round ferrule 301 of 0.7 mm made of Zirconia™ with a standard fiber 303 inside may be placed through each of the MT connector's guide pin hole 265, 267 and extend out past the front end 104b of the connector body 104. In this manner, the fiber 303 will align precisely with the hole 265, 267. Such a ferrule can be readily manufactured and the off-axis position measured with accuracy likely better than 0.1 microns.

Alternately, with reference to FIGS. 4 and 5, a precision mechanical milled jig 250 may be used that contains two pins 251, 253 alignable with the guide pin holes 265, 267 of the connector body 104. Also, an opening 257 is provided so that the light from the fibers in the ferrule assembly 261 of the connector can pass through the jig 250. The jig 250 further comprises at least two optical fibers 273 in holes 259 parallel to the two pins 251, 253, which fibers can be illuminated to emit light onto the PSD detecting surface. Six fibers 273 and holes 259 are shown in the embodiment of FIG. 5. The holes 259 are in a very precisely known position relative to the pins 251, 253.

The two pins 251, 253 of the jig 250 are inserted into the guide pin holes 265, 267 in the front end of an MT connector 260. The jig 250 may be made of a relatively hard material so that the connector 260 will flex, rather than the jig 250, to accommodate any mismatch between the pins 251, 253 of the jig 250 and the guide pin holes 265, 267 of the connector 260. This will minimize distortion of the jig, which might alter the precisely known location of the pins 251, 253 relative to the holes 259. Each fiber 273 in the tool 250 is then individually illuminated to cause a beam spot to fall on the PSD detecting surface. Since the positions of the pins 251, 253 on the tool 250 are very precisely known relative to the holes 259 on the tool in which the fibers 273 are disposed, the two or more beam spots falling on the PSD detecting surface precisely disclose the position of the pins 251, 253 of the tool 250, and, hence the positions of the guide pin holes 265, 267 of the connector 260 in which they are positioned In theory, the jig 250 can be removed before illuminating the fibers in the ferrules of the connector, however, it is preferable to perform the measurements of the fiber positions in the connector without removing the jig since moving the jig may disrupt the connector also, the position of which should not change during the entire measurement process.

Figure 2:
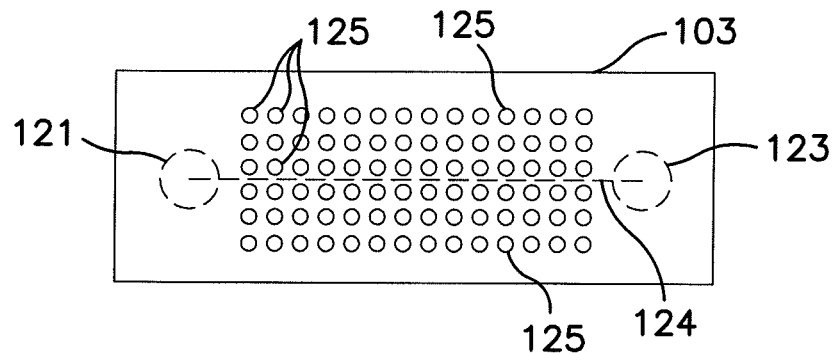
FIG. 2 is a diagram illustrating beam spots illuminating the detector surface of a PSD in accordance with the principles of the present invention.

In any event, FIG. 2 illustrates at 121 and 123 exemplary positions of the light beam spots on the detecting surface 103 corresponding to the two guide pin holes 265, 267 of an exemplary connector body 104. The dashed line 124 between the centers of the two beam spots 121, 123 can be calculated in computer 114 (FIG. 1) and represents the horizontal axis of the connector thereby for establishing the both the position and the angular orientation of the connector body 104.

Next, one of the guide pin holes 265, 267 is selected as a mechanical reference for the measurements of all of the fiber positions.

An individual fiber is then illuminated at the back end 109 of the cable 106 with a laser, LED, or other light source. The position of the resulting light beam spot 125 (FIG. 2) emitted from fiber at the front end 104a of the connector body 104 on the PSD detecting surface 103 is detected and stored.

This is repeated for each optical fiber in the cable/connector assembly 107; producing 72 separately detected light beam spots 125 on detecting surface 103 (see FIG. 2). It should be understood that, while FIG. 2 shows all 74 beam spots on detecting surface 103 (72 fiber plus the two guide pin holes), at any given instant, only one beam illuminates the detecting surface so as to allow the detector to measure the position of each beam spot.

Next, all of the measured positions/spots 125 of the fibers are compared to the measured position 121, 123 of at least one of the guide pin holes and alignment line 124 to determine if they are within the specified tolerance relative to each other. A PASS decision is made if all of the fibers are within desired tolerances. Otherwise the connector/cable assembly FAILS.

It should be noted that the invention need not be used merely for PASS/FAIL determinations. For instance, it may alternatively or additionally be used to collect data for statistical analysis purposes.

Further, during these position measurements, the system 100 also may be used to simultaneously take intensity measurements for each fiber, which measurements can be used to simultaneously test for any faulty, broken, or otherwise poorly performing optical fibers.

The invention can be used in connection with any type of connector or other form of termination for optical fibers, including molded optics with lenses, single fiber connectors, and multi-fiber connectors with either multi-mode fibers or single mode fibers.

Many, if not all, PSDs will require calibration prior to being used as described hereinabove in order to provide absolute measurements (i.e., actual values in known units of measurement, such as microns or mils), rather than relative measurements. The PSD 101 can be calibrated any number of ways. In one option, the two guide pin holes are illuminated one at a time by passing a light beam through each onto the PSD detecting surface 103. The system 100 is then used to measure and store the positions of the two beam spots passed through the guide pin holes. This information can be used to calibrate the system's X-Y coordinate to absolute measurements since the distance between the two guide pin holes is a known distance.

Calibration using the two guide pin holes as described above, however, may not be accurate enough for many applications. Specifically, the distance between the guide pin holes in an MT connector according to the relevant specification is 4.6 mm±3 microns. Accordingly, if an accuracy of more than 3 microns is desired, as will often be the case, a different calibration technique will be desired. One technique involves positioning a standard optical fiber in front of a PSD 101, emitting light from it, measuring the position of the resultant light beam spot on the PSD detecting surface 103, moving the fiber a precise predetermined distance, again emitting light from it, measuring the new position of the resultant light beam spot on the PSD detecting surface 103 and then calibrating the difference to the known distance that the fiber was moved. Alternately, the tool 250 may be use to calibrate the system since, as mentioned above, it may be fabricated with the locations of the fibers 250 accurately known relative to each other within about 0.1 microns.

The exemplary PSD 101 mentioned above can operate at speeds as high as 15,000 samples per second with a resolution of 0.1 microns. Accordingly, with the incorporation of equipment to automate the testing process of the present invention (either directly in the manufacturing line or after manufacture is completed), it is believed that, using the exemplary equipment mentioned above, the system 100 should be capable of fully testing 72-fiber MT connectors (i.e., two guide pin holes plus 72 fibers) at a rate of about one connector body 104 per second or faster. This should be compared to conventional techniques, which require approximately ten minutes to test a 72 fiber MT connector for fiber alignment.

If the testing system and method of the present invention is incorporated directly within the manufacturing line, it can decrease overall manufacturing costs by detecting faulty cable/connector assemblies early in the manufacturing process before subsequent additional-cost steps are performed on the faulty assemblies, which will be discarded in any event.

As mentioned above, a system in accordance with the principles of the present invention also can be used to simultaneously measure insertion loss by measuring the intensity of the light beam spots for each fiber in order to detect any faulty fibers. In the present state of the art, conventional insertion loss testing for a 72 fiber MT connector requires another ten minutes (approximately). Accordingly, the present invention substantially reduces the combined time required for measuring fiber position and insertion loss from about twenty minutes per 72-fiber MT connector to about one second per cable/connector assembly.

Furthermore, since the testing process in accordance with the principles of the present invention is entirely optical and the fiber alignment measurements are all relative measurements, the mounting mechanism and tooling can be relatively low cost since extremely accurate positioning of the connector-under-test relative to the PSD is not necessary.

Figure 6:
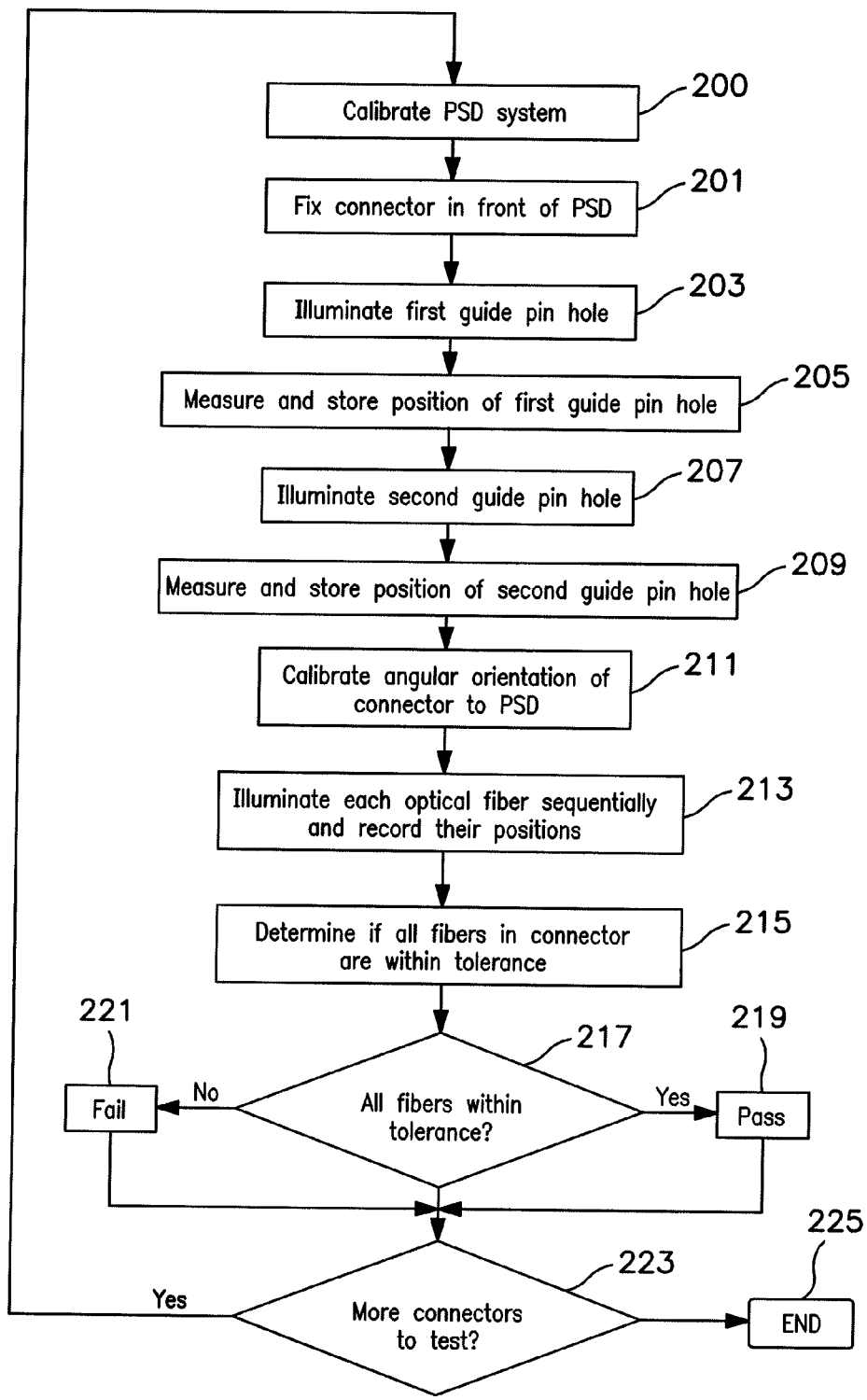
FIG. 6 is an exemplary flow diagram illustrating the process of measuring fiber alignment in accordance with the principles of the present invention.

FIG. 6 is a flowchart illustrating operation in accordance with the one particular embodiment of the present invention. In step 200, the system 100 is calibrated, for instance, by using any of the techniques discussed hereinabove. In step 201, a connector of a cable/connector assembly 107 is placed in a fixed position in front of the PSD detecting surface 103. Preferably, the connector body 104 is positioned so that the light emitted from the individual fibers in the connector will be in beams perpendicular to the detecting surface 103. In this manner, direct measurements of the relative positions of the fibers relative to each other and to the guide pin holes can be made. If the light beams do not emanate from the front end 104b of the connector body 104 perpendicularly to the detecting surface 103, then a mathematical algorithm would be necessary to convert the measured positions of the light beams relative to each other to determine if they are within tolerance.

In any event, in step 203, a light beam is passed through the first guide pin hole 265. In step 205, the position of that light beam on the detecting surface 1103 is detected and stored. Next, in step 207, a light beam is passed through the second guide pin hole 267. In step 209, the position of the second guide pin hole is detected and stored. In step 211, the angular orientation of the connector body 104 relative to the PSD detecting surface 103 is calculated, such as by determining the line 124 between the centers of the light beam spots 121, 123 corresponding to the two guide pin holes 265, 267 as previously described.

Next, in step 213, each individual fiber 111 is illuminated sequentially and the position of the corresponding light beam spot 125 on the PSD detecting surface 103 is detected and stored. Next, in step 215, all of the stored position data for each individual optical fiber is compared to the position data for the guide pins. The positions of the fibers also may be compared to each other since there also may be tolerances for the relative positions of the fibers to each other.

Of course, this particular embodiment is merely exemplary. In order to increase the throughput speed of connectors during this testing process, the determination of whether the position of any individual fiber is within tolerance relative to the guide pins and/or any fibers previously measured can be performed directly after each fiber is illuminated (rather than waiting for all fibers to be illuminated and measured). This will save time in detecting unacceptable connectors since, if a connector must be failed because the first fiber illuminated is out of tolerance, there would be no need to test the remaining fibers' positions. Although, the invention enables testing at such a high rate (about 1 connector per second), this time saving may not be a significant factor.

In any event, in step 217, a decision is made as to whether the fiber positions in the connector are within tolerance. If so, flow proceeds to step 219 where a PASS is issued. If not, flow instead proceeds to step 221 where a FAIL is issued.

The process is repeated for each connector that is to be tested. Thus, in step 223, it is determined if there are more connectors to be tested. If so, flow proceeds back to step 200 so that the process is repeated for the next connector. If not, flow ends at step 225.

It is believed that measurement accuracy to within 0.25 microns can be obtained with the aforementioned exemplary equipment from On-Trak Photonics, Inc. However, it is believed that accuracy can be improved to 0.1 microns or even greater by using more precise equipment and/or by simply adding or improving the electronics and/or the software used in the exemplary hardware.

Of course, on a mass production scale, virtually all of the steps outlined above can be automated. It is believed that testing rates of one 72 fiber MT ferrule per second can be easily achieved.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of measuring positions of optical fibers in an optical fiber connector comprising:
    fixedly positioning a fiber optic connector body having at least one optical fiber in front of an isotropic position sensing detector (PSD) so that light emanating from the at least one optical fiber will strike substantially perpendicular to a sensor surface of the position sensing detector;
    passing a first light beam onto the sensor surface of the isotropic PSD through at least one guide pin hole of the fiber optic connector body;
    determining, using the isotropic PSD, a location of a first beam spot from the first light beam on the sensor surface;
    illuminating the at least one optical fiber to cause a second light beam to emanate from the at least one optical fiber to produce a second beam spot on the sensor surface of the isotropic PSD;
    determining, using the isotropic PSD, a location of the second beam spot on the sensor surface; and
    comparing the location of the first beam spot and the location of the second beam spot to determine if the at least one optical fiber is correctly positioned in the fiber optic connector body.

2. The method of claim 1 wherein the fixedly positioning comprises positioning the fiber optic connector body so that the second light beam emanating from the at least one optical fiber is substantially perpendicular to the sensing surface.

3. The method of claim 1 wherein the sensing surface is coupled to a plurality of electrodes at different locations on the sensing surface and wherein the determining of the locations of the first and second beam spots comprises detecting current flow at each of the electrodes.

4. The method of claim 1 further comprising:
converting the location of the first and second light beams into absolute measurements.

5. The method of claim 1 further comprising determining a magnitude of the second beam spot and comparing said magnitude to a predetermined value to determine whether the optical fiber meets performance requirements.

6. The method of claim 1 wherein the at least one guide pin hole comprises at least first and second guide pin holes and determining the location of the first beam spot comprises determining first and second positions of the first beam spot.

7. The method of claim 4 further comprising displaying positions of the first and second light spots.

8. The method of claim 5, wherein said magnitude is determined essentially simultaneously with the location of the second spot.

9. The method of claim 6 wherein the fiber optic connector body is an MT style connector body.

10. The method of claim 6 wherein the at least one optical fiber comprises a plurality of optical fibers and further wherein the illuminating comprises individually illuminating each optical fiber sequentially and wherein determining the location on the sensing surface of the second light spot comprises determining the location on the isotropic position sensing detector of the second light spot corresponding to each individual optical fiber and further wherein the comparing comprises comparing the location of the second light spot to the location of the first light spot for each individual optical fiber.

11. The method of claim 10 wherein the passing comprises individually passing the first light beam through said first and second guide pin holes sequentially and determining the location of the first light spot comprises determining the location of the first light spot corresponding to each individual guide pin hole and further wherein the comparing comprises comparing the locations of the second light spot to the locations of the first light spot for each individual optical fiber and each individual guide pin hole.

12. An apparatus for measuring positions of optical fibers in an optical fiber connector comprising:
an isotropic position sensing detector (PSD) having a sensing surface for detecting a particular location within the sensing surface that a light beam strikes the sensing surface;
a mounting device for fixedly mounting an optical fiber connector body relative to the isotropic position sensing detector such that light emanating from an optical fiber in the optical fiber connector body will strike substantially perpendicular to the sensing surface; and
a circuit coupled to the isotropic position sensing detector for determining relative locations of a first light spot on the sensing surface from a first light beam passing through at least one guide pin hole of the optical fiber connector body mounted to the mounting device and striking the sensing surface and a second light spot on the sensing surface from a second light beam emanating from the optical fiber and striking the sensing surface and determining if the location of the first light spot and the location of the second light spot indicates that the optical fiber is correctly positioned in the optical fiber connector body.

13. The apparatus of claim 12 further comprising:
a position sensing amplifier coupled between the isotropic position sensing detector and the circuit.

14. The apparatus of claim 12 further comprising:
a display unit for displaying position data of the first and second beams on the sensing surface.

15. The apparatus of claim 12 further comprising a conversion unit for converting location data for the first and second light beams into absolute position data.

16. The apparatus of claim 12 wherein the circuit includes a programmed general purpose computer.

17. The apparatus of claim 12 wherein the circuit is adapted to store data of locations of a plurality of second light spots emanating from a plurality of optical fibers in a single connector body and is further adapted to store data of locations of a plurality of first light spots passed through a plurality of guide pin holes of the single connector body and to compare the locations of the plurality of second light spots to the locations of the plurality of first light spots to determine if all of the plurality of second light spots are properly positioned relative to the plurality of first light spots.

18. The apparatus of claim 12 wherein the mounting device is configured to mount the optical fiber connector body so that a light beam emanating from the optical fiber is substantially perpendicular to the sensing surface.

19. The apparatus of claim 12 wherein the sensing surface is coupled to a plurality of electrodes at different locations on the sensing surface and wherein the isotropic position sensing detector generates output current flows at the electrodes the relative magnitudes of which are indicative of the relative proximity to each electrode of a light beam striking the sensing surface.

20. The apparatus of claim 12, wherein the circuit also determines a magnitude of the second beam spot and compares said magnitude to a predetermined value to determine whether the optical fiber meets performance requirements.

* * * * *